Oct. 2, 1928.

B. A. PETERSON

WINDER

Filed Sept. 11, 1919   5 Sheets-Sheet 1

1,686,102

Inventor
Burt A. Peterson

By Luther L. Miller
Atty

Oct. 2, 1928.
B. A. PETERSON
WINDER
Filed Sept. 11, 1919
1,686,102
5 Sheets-Sheet 2
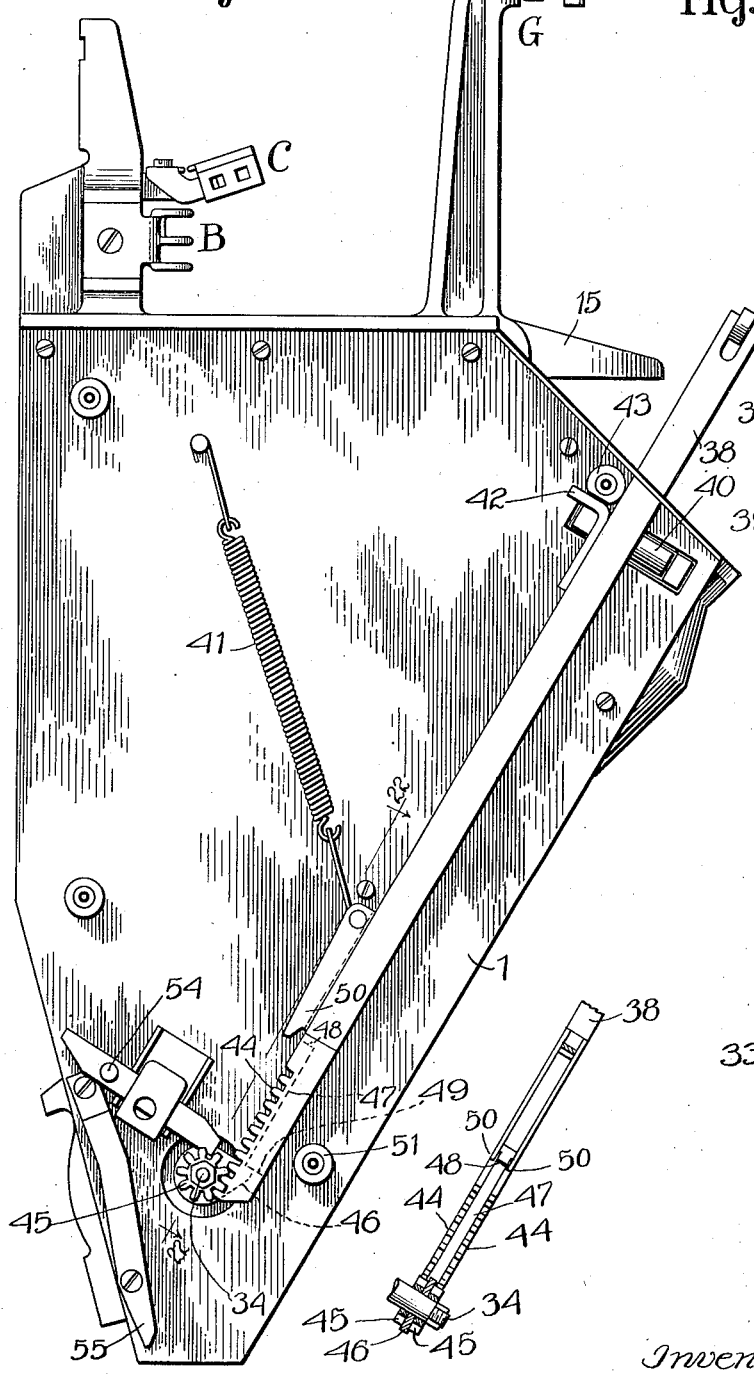
Fig. 2
Fig. 22
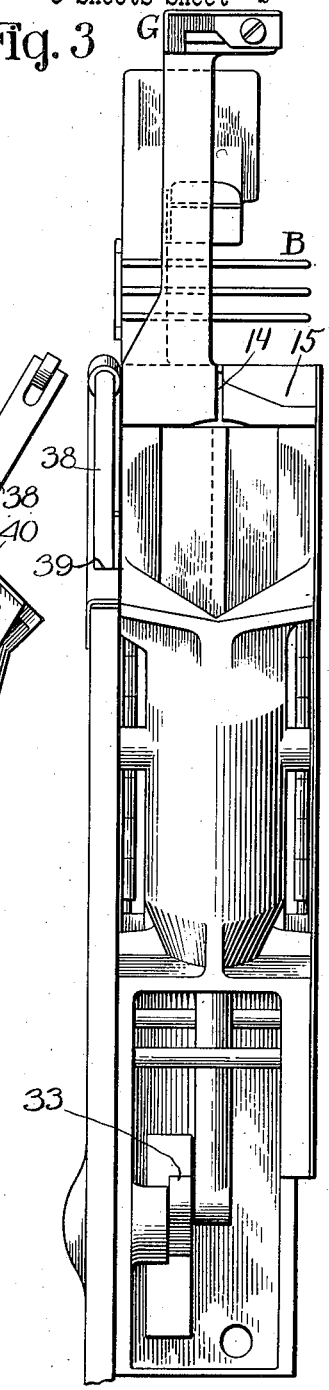
Fig. 3
Inventor
Burt A. Peterson
By Luther L. Miller
Atty Oct. 2, 1928.  
B. A. PETERSON  
WINDER  
Filed Sept. 11, 1919  
1,686,102  
5 Sheets-Sheet 3
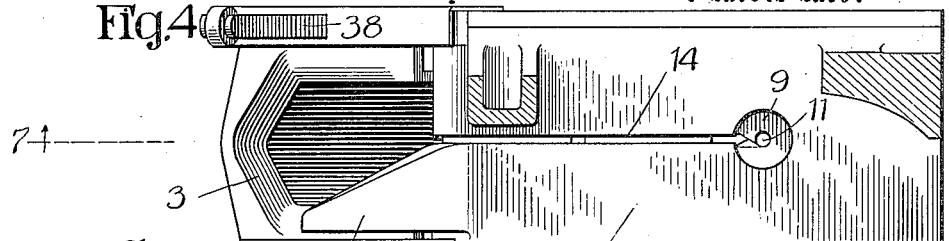
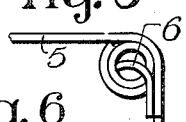
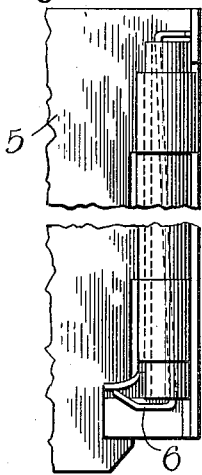
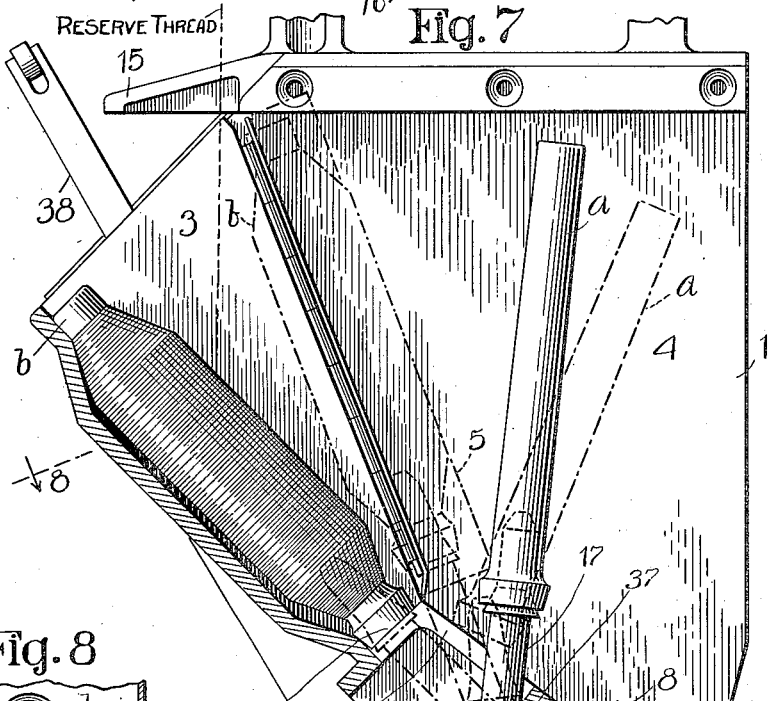
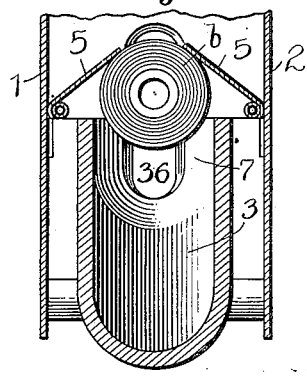
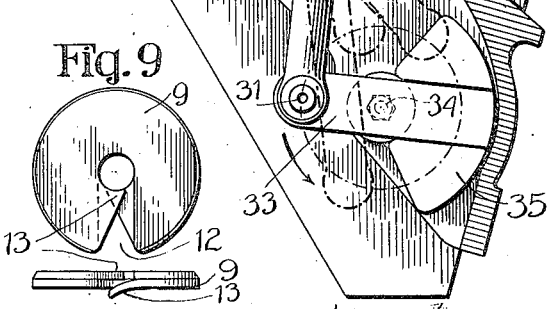
Inventor  
Burt A. Peterson Oct. 2, 1928.
B. A. PETERSON
WINDER
Filed Sept. 11, 1919
1,686,102
5 Sheets-Sheet 4
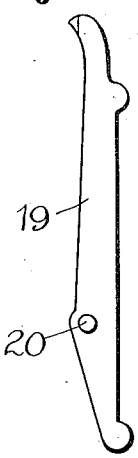
Fig.11
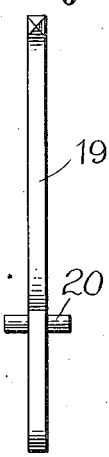
Fig.12
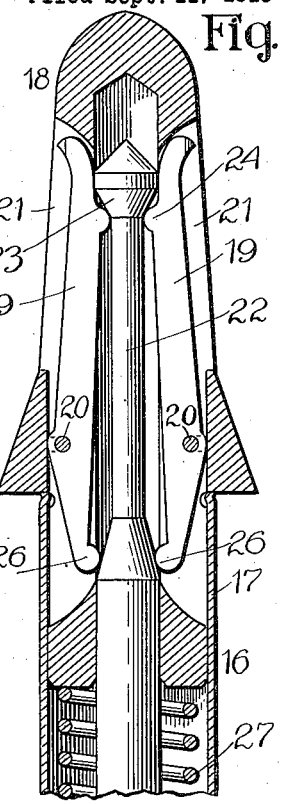
Fig.13
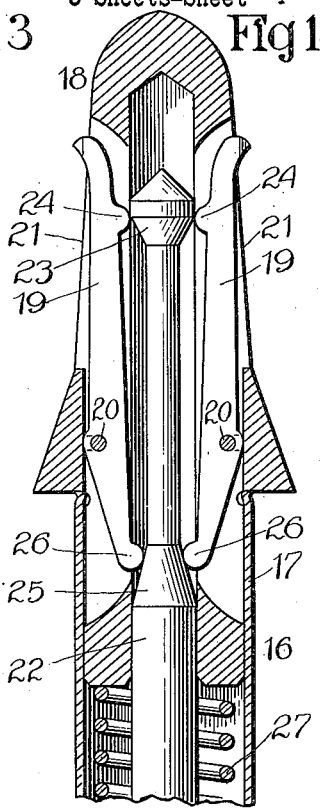
Fig.14
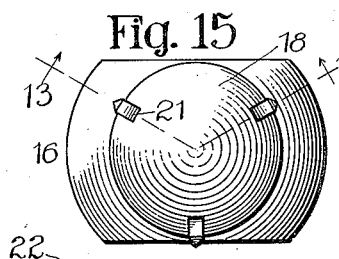
Fig. 15
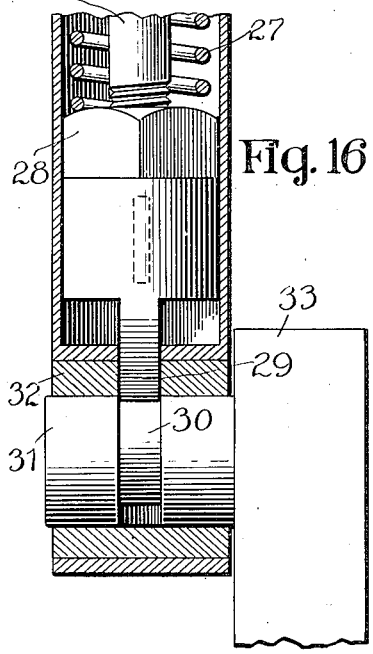
Fig. 16
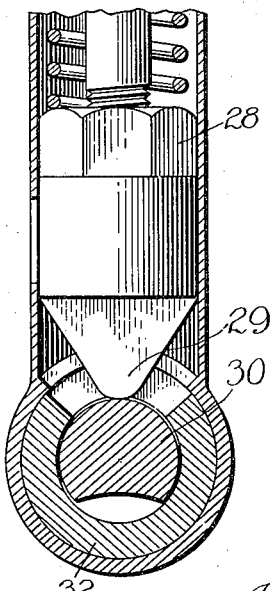
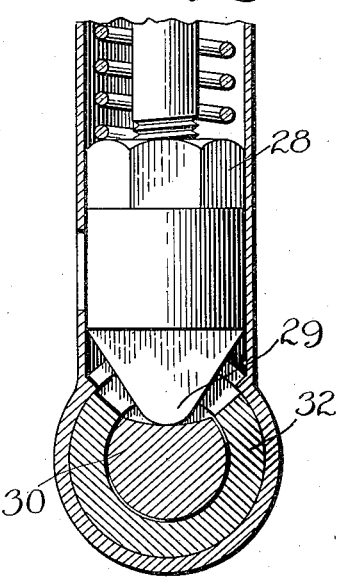
Inventor
Burt A. Peterson
By Luther L. Miller
Atty.

Patented Oct. 2, 1928.

1,686,102

UNITED STATES PATENT OFFICE.

BURT A. PETERSON, OF ROCKFORD, ILLINOIS, ASSIGNOR, BY MESNE ASSIGNMENTS, TO EDGAR S. NETHERCUTT, OF EVANSTON, ILLINOIS.

WINDER.

Application filed September 11, 1919, Serial No. 323,194. Renewed December 28, 1927.

This invention relates to improvements upon the forms of bobbin-holders disclosed in applications Serial Nos. 323,074 and 323,075 filed by Howard D. Colman and Burt A. Peterson. The general object of the invention is to increase the efficiency and reliability of self-skewering bobbin-holders and reduce the cost of manufacture.

Figure 1:
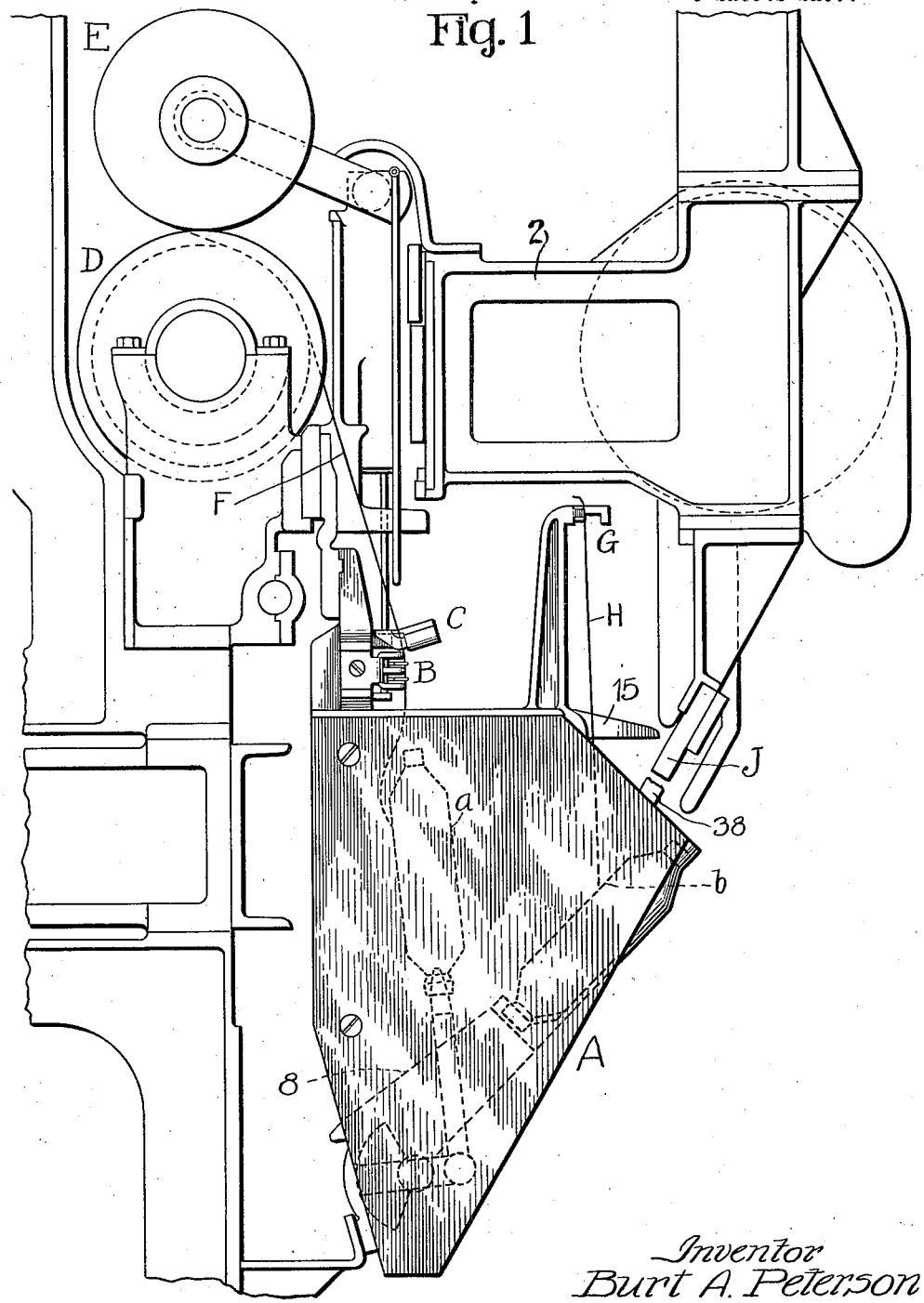
Figure 17:
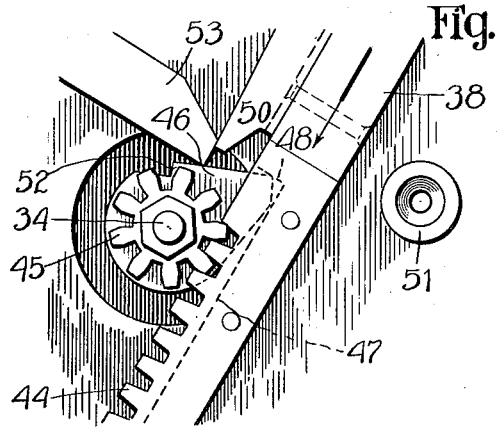
Figure 20:
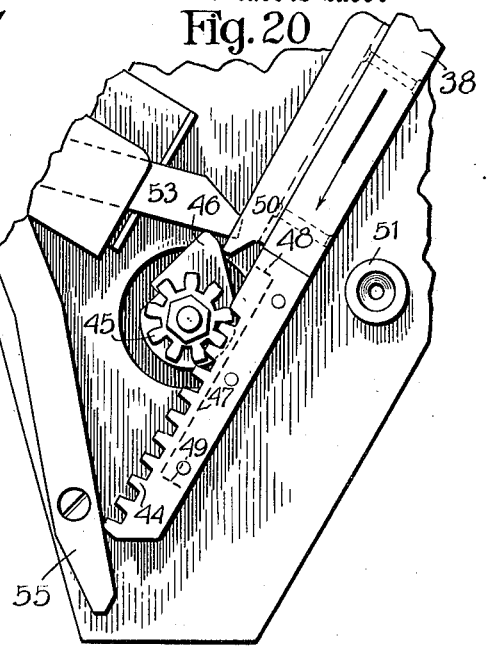
Figure 18:
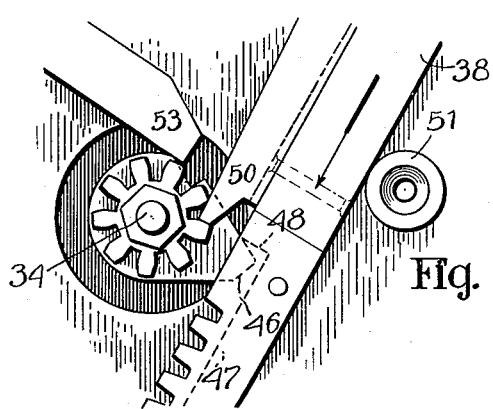
Figure 19:
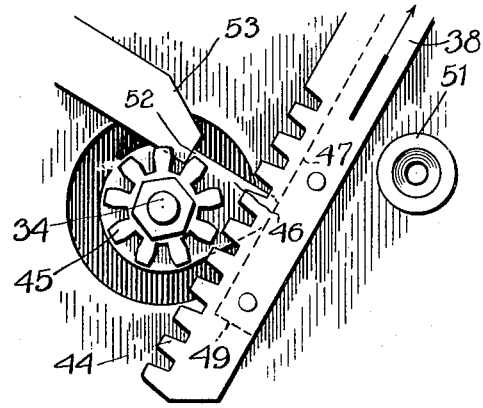
Figure 21:
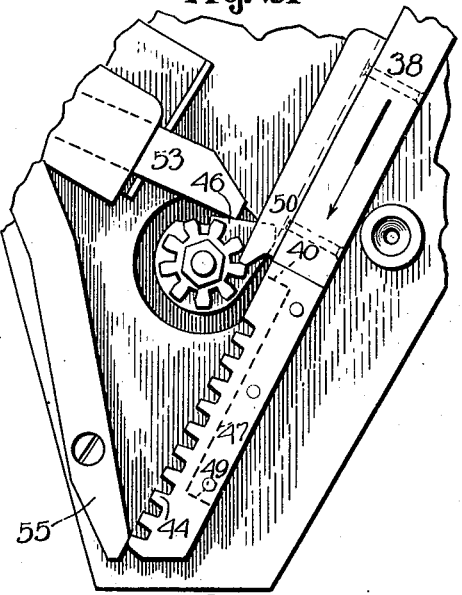

In the accompanying drawings Fig. 1 is a view taken transversely of a winder embodying the features of my invention. Fig. 2 is a side elevation of the bobbin-holder, with one side plate removed to disclose some of the mechanism. Fig. 3 is a front view of the bobbin holder. Fig. 4 is a plan view of the bobbin holder. Figs. 5 and 6 are detail views of one of the hinged gates comprised in the bobbin-holder. Fig. 7 is a vertical sectional view taken approximately in the plane of dotted line 7 of Fig. 4. Fig. 8 is a view taken approximately in the plane of dotted line 8 of Fig. 7, but showing the reserve bobbin as being moved to the running position. Figs. 9 and 10 are detail views of the thread guide. Figs. 11 and 12 are detail views of one of the clamping fingers comprised in the skewer. Figs. 13 and 14 are fragmental sectional views of the skewer, the upper portions of the views being taken in the plane of line 13—13 of Fig. 15. Fig. 13 shows the skewer in condition to be inserted into a bobbin. Fig. 14 shows the bobbin-engaging fingers in position to engage the bobbin, Fig. 15 is a plan view of the skewer. Fig. 16 is a fragmental sectional view showing the means for operating the bobbin-engaging fingers. Figs. 17, 18 and 19 illustrate successive positions of the skewer-operating mechanism. Figs. 20 and 21 illustrate abnormal positions of the skewer-operating mechanism. Fig. 22 is a fragmental view taken in the plane of line 22—22 of Fig. 2.

In Fig. 1 A is a bobbin holder, B is a detector, C is a snick plate and D is a cam drum for rotating the receiving yarn mass E and for traversing the active thread F. G is a clamp for holding the end of the reserve thread H. The winder comprises a series of winding units such as the one just described. I is a mechanism arranged to travel along the winder for successively operating upon the winding units. In Fig. 1, the mechanism I may be assumed to be traveling away from the observer, having passed the particular unit shown in said view. The active bobbin is represented at $a$. The operator has placed a reserve bobbin $b$ in the bobbin-holder and has inserted the end of the thread of said bobbin in the clamp G.

In the embodiment herein shown the bobbin holder A comprises a framework which includes parallel side plates 1 and 2 and certain portions formed of cast metal, all rigidly secured together and stationarily mounted in the frame of the winder. The space within the framework of the bobbin holder is divided into a reserve bobbin pocket 3 and a compartment 4 to contain the bobbin being unwound. The pocket 3 is separated from compartment 4 by means of a yieldable partition consisting, in this instance, of two hinged gates 5 arranged to swing toward and away from each other, said gates being normally held in closed position by means of springs 6. The bobbin pocket 3 has a bottom 7 upon which the reserve bobbin $b$ stands. The front wall of the reserve bobbin pocket 3 is forwardly inclined, and said front wall and the partition 5 converge toward their lower ends so as to position the butt of the reserve bobbin on the bottom wall 7. The floor 8 of the compartment 4 is inclined rearwardly and downwardly, and the rear side of said compartment is open.

Any suitable means may be provided for guiding the active thread F at a point intermediate the bobbin and the detector B. Herein is shown a thread guide consisting of a member 9 (Figs. 4, 9 and 10) mounted in the top wall 10 of the compartment 4 and having a thread-guide opening 11 which is in substantial alignment with the active bobbin. 12 is a flaring throatway leading to the opening 11. At the inner end of the throatway are two overlapping oppositely extending fingers 13 which serve to retain the running thread in the opening 11. The fingers 13 are spaced apart to form a passage for the entering thread. In the top wall 10 is a slot 14 (Fig. 4) through which the reserve thread may pass to the thread guide. At one side of the passage 14 is a guard finger 15 projecting forwardly over the reserve bobbin pocket to prevent the thread from being carried laterally by the traveling mechanism I out of position to enter said passage.

The bobbin skewer 16 comprises, in this instance, a tubular stem 17 having a head 18 of suitable form and dimensions to enter the lower portion of the bore of a bobbin. In order that engagement and disengagement of the bobbin and the skewer shall not require a long movement, the head 18 is adapted to enter only the lower end of the bobbin bore. The lower portion of the head 18 is flared outwardly as at 18$^a$ to form a seat for the butt of the bobbin. This seat being tapering, the skewer is adapted to engage the lower end of any bobbin firmly, regardless of slight variations in the internal diameter of different bobbins. The head 18 is equipped with means for positively engaging the bobbin at a point or points above the seat 18$^a$ so as to hold it securely in place on the skewer, notwithstanding the relatively short distance that the skewer enters the bobbin. While this means may be of any suitable character, that herein shown consists of three fingers 19 pivoted at equidistant points 20 in the head, the upper portions of the fingers extending into slots 21 in the head 18, and the upper ends of the fingers being pointed to engage the interior wall of the bobbin. The means for pivotally moving the fingers 19 comprises a plunger 22 mounted in the stem 17 and reciprocable axially of said stem. The upper end of the plunger 22 has a conical surface 23 adapted to engage projections 24 on the upper portions of the fingers 19 to force said fingers outwardly into engagement with the bobbin. The plunger 22 also has a conical surface 25 adapted to force the lower ends 26 of the fingers apart, and thus withdraw the upper ends of said fingers from the bobbin.

The means for reciprocating the plunger 22 comprises a coiled expansion spring 27 surrounding the plunger and enclosed within the tubular stem 17. One end of the spring 27 bears against a stationary part within the stem 17, while the opposite end of the spring bears against a nut 28 on the plunger. At the lower end of the plunger is a lug 29 that bears upon the cam portion 30 of a crank pin 31. Sa'd crank pin is mounted in a bearing 32 connected to the lower end of stem 17. The crank pin 31 is fixed to an arm 33 which is rigid with a shaft 34. 35 is a counterweight connected to the arm 33 at the side of the shaft 34 opposite to the crank pin 31.

As shown in Figs. 7 and 8, the skewer 16 extends through a slot 36 formed partly in the bottom 7 of the reserve bobbin pocket 3, and partly in the floor 8 of the compartment 4. When the operator drops a bobbin into the reserve bobbin pocket, the bobbin comes to rest with the bore thereof in register with the slot 36. This slot is not of sufficient width to permit the butt of the bobbin to pass therethrough. The floor 8 therefore constitutes a stationary stripping element. Intermediate the floor 8 and the orbit of the crank pin 31 the skewer 16 extends between two pins 37. It will be seen that as the crank pin 31 moves through its orbit the skewer will fulcrum on the pins 37, whereby the head 18 of the skewer will be moved as indicated by the several dotted positions in Fig. 7, and the fingers 19 will be moved to engage and release the bobbin.

In the present embodiment, the means for rotating the shaft 34 to actuate the skewer comprises a plunger 38, the upper end of which is arranged to be engaged by a cam bar J carried by the traveling mechanism I. In Fig. 1 the upper portion of the plunger 38 is broken away to disclose the cam bar J. The upper portion of the plunger 38 extends through a guide opening 39 in a flange on the side wall 1. Adjacent to said guide opening is an anti-friction roller 40 against which the plunger 38 bears when the upper end of the plunger is engaged by the cam bar J. 41 is a contractile spring which is anchored at its upper end to the side plate 1. The lower end of the spring 41 is connected to the plnger 38 and tends to move said plunger upwardly, the upward movement of the plunger being limited by the contact of the stop lug 42 with a stationary portion 43 of the frame work of the bobbin holder. The spring 41 tends to move the lower portion of the plunger laterally and upwardly. Upon the lower end of the plunger 38 are two series of rack teeth 44 which are adapted to mesh with two pinions 45 fixed on the shaft 34. Also fixed on said shaft between the racks and pinions is a lug 46 which is arranged to engage a surface 47 formed on the plunger 38 between the series of rack teeth 44. At the upper end of the surface 47 is a shoulder 48, and at the lower end is a shoulder 49. Fixed to the plunger 38 above the series of rack teeth 44 are two fingers 50 adapted to engage the pinions 45. 51 is a stop to limit lateral movement of the plunger 38 away from the pinion 45. Rigid with the shaft 34 is a shoulder 52 which is arranged to be engaged by a pawl 53 which is pivoted to the side plate 1 at 54.

Assuming the parts to be in the position shown in Fig. 2 and in full lines in Fig. 7, the operation is as follows:

By the time the mechanism I reaches any particular winding unit the active bobbin $a$ will ordinarily have been unwound, as shown in Fig. 7, or the thread will have broken, but if the thread is still running, the mechanism breaks the thread. The cam bar J of the traveling mechanism depresses the plunger 38 against the tension of spring 41, the rack teeth 44 rotating the pinions 45. By the time the pinions have nearly completed one revolution, the lug 46 is engaged by the shoulder 48 (see Fig. 17). The pressure of the shoulder 48 against the lug 46 causes the lug, bearing against the surface 47, to force the plunger 38 laterally far enough to disengage the rack teeth from the pinions. Continued downward movement of plunger 38 brings the fingers 50 into the path of the pinion teeth, preventing the pinions and shaft from overrunning by momentum. (Such overrunning will not occur in the ordinary operation of the mechanism I, but may happen if the plunger 38 is depressed quickly by hand.) Should they overrun the pressure of the pinion teeth against the fingers 50 pushes the bar against the stop 51. The parts will then be in position as shown in Fig. 18. Further rotation of the pinions will be prevented by the engagement of a pinion tooth with the upper surface of the fingers 50. As the cam bar J leaves the plunger 38 the spring 41 is permitted to move the plunger upwardly. As the plunger 38 starts upwardly the pressure of the surface 47 against the lug 46 causes the shaft 34 to turn until checked by the engagement of the pawl 53 with the stop shoulder 52 (see Fig. 19). The plunger 38 continues to move upwardly, the rack teeth 44 being held out of engagement with the pinions 45 through contact of the lug 46 with the surface 47. As the plunger reaches its normal position the surface 47 moves past the lug 46, whereupon the spring 41 moves the plunger 38 sidewise, thus restoring the rack teeth into engagement with the pinions, and placing the shoulder 49 above the lug 46, as in Fig. 2.

The rotation just described of the shaft 34 causes the skewer 16 to move as indicated in broken lines in Fig. 7. The normal position of the skewer is shown in full lines in said figure. When the shaft 34 begins to rotate, the cam portion 30 of the crank pin 31 causes the fingers 19 to be withdrawn from engagement with the bobbin a. Continued movement of the shaft 34 carries the skewer down until the butt of the bobbin stops against the floor 8 of the compartment 4, whereupon the bobbin stops and the skewer continues to move down until the head 18 is almost completely withdrawn from the bobbin. By reason of the inclination of the floor 8 the bobbin topples rearwardly and falls out through the open rear side of the compartment 4. In the continuing rotation of the shaft 34 the skewer fulcrums upon the pins 37 and is projected into the lower end of the reserve bobbin b. As the shaft continues to rotate the upper portion of the skewer moves upwardly and rearwardly, carrying the reserve bobbin past the gates 5 and into the compartment 4, the fingers 19 being moved by the cam portion 30 of the crank pin 31 into engagement with the bobbin a little before the bobbin reaches the running position shown in full lines in Fig. 7.

Before the reserve bobbin is carried into winding position the thread of said bobbin has been united to the exhausted thread. As the bobbin moves into winding position the thread passes into the slot 14, the tension of winding causing the thread to enter the thread guide opening 11. After the traveling mechanism has passed the bobbin-holder, the operator places a bobbin in the reserve bobbin pocket 3, and inserts the end of the thread of said bobbin in the clamp G above the reserve bobbin pocket.

In the normal operation of the bobbin-holder, the skewer is operated to discharge the spent bobbin and place the reserve bobbin in unwinding position during the downward movement of the plunger 38. The skewer is locked in unwinding position by means of the spring 41 acting through the racks 44, the pinions 45, the shoulder 52 and the pawl 53 (see Fig. 2).

In case of abnormal resistance to rotation of the shaft 34 as, for instance, because of jamming of the bobbin, the racks 44 will jump out of and into mesh with the pinions 45 during the downward movement of the plunger 38. If the ends of the fingers 50 were to strike against the end of a tooth of the pinions, further descent of the plunger would be prevented and the traveling mechanism would be forced upwardly out of its normal path of movement. To prevent such an occurrence, there is provided on the side plate 1 a fixed guide bar 55 (Fig. 20). If the lug 46 does not force the racks sidewise out of mesh with the pinions 45, the ends of the racks strike the guide bar 55, whereby the racks are deflected away from the pinions and the path of movement of the fingers 50 shifted so that the ends of the fingers 50 cannot stop against the end of a pinion tooth. The engagement of the fingers 50 with the side of a pinion tooth will cause the shaft 34 to turn as will appear by a comparison of Figs. 20 and 21. If during such turning, the cause of the sticking of the parts has been removed, the spring 41, when permitted by the cam J, will produce reverse rotation of the shaft into normal position.

As shown in Fig. 3, the guide opening 39 is elongated to permit the upper end of the plunger 38 to be moved laterally for the purpose stated in my application Serial No. 342,381, filed December 4, 1919. The antifriction roller 40 is long enough to support the plunger 38 at all times.

While I have described the present embodiment of the invention with considerable particularity, the description is not intended to define the invention, inasmuch as I recognize that the invention may be embodied in various forms.

In the following claims the term "yarn" is intended to include all other generally similar material, and the terms "yarn mass" and "bobbin" are intended to be broadly construed.

I claim as my invention:

1. A bobbin-holder comprising two side walls, means between the forward portion of said walls for forming an inclined reserve bobbin pocket having a bottom wall, spring-held gates defining a compartment behind the pocket, the rear side of said compartment being open, a floor in said compartment inclined downwardly toward said open side, said bottom wall and floor having a slot therein, a bobbin-skewer extending through said slot, a rotatable element to which the lower end of the skewer is pivoted, and fulcrum means slidably engaging the skewer between its ends, the rotation of said element serving to withdraw the skewer from a spent bobbin, insert the skewer into a reserve bobbin contained in said pocket, and move said reserve bobbin past the gates and into said compartment.

2. A bobbin-holder comprising a reserve bobbin pocket having a bottom wall, there being a compartment behind the pocket, the rear side of said compartment being open, a floor in said compartment inclined downwardly toward said open side, said bottom wall and floor having a slot therein, a bobbin skewer extending through said slot, a rotatable element to which the lower end of the skewer is pivoted, and fulcrum means slidably engaging the skewer below the slot, the rotation of said element serving to withdraw the skewer from a spent bobbin, insert the skewer into a reserve bobbin contained in said pocket, and move said reserve bobbin into said compartment.

3. A bobbin-holder comprising a reserve bobbin pocket having a bottom wall, there being a compartment behind the pocket, a floor in said compartment, said bottom wall and floor having a slot therein, a bobbin skewer extending through said slot, a rotatable element to which the lower end of the skewer is connected, and means below the slot for guiding the skewer during the rotation of said element, the rotation of said element serving to withdraw the skewer from a spent bobbin, insert the skewer into a reserve bobbin contained in said pocket, and move said reserve bobbin into said compartment.

4. The combination of a bobbin skewer, a shaft operatively connected to the skewer, a pinion on the shaft, means to prevent reverse rotation of the shaft, a plunger having a rack adapted to engage the pinion, a lug on the shaft, said plunger having a shoulder above the rack and a surface extending longitudinally of the plunger from said shoulder to a point near the lower portion of the rack, said lug being arranged to be engaged by said shoulder when the plunger is moved downwardly and to slide along said surface when the shaft is held against rotation and the plunger is moving upwardly, means to move the plunger downwardly, a spring tending to move the plunger upwardly and also in the direction to move the rack toward the pinion, a finger on the plunger near said shoulder arranged to engage a tooth of the pinion, and means to limit lateral movement of the plunger away from the pinion.

5. The combination of a bobbin skewer, a shaft operatively connected to the skewer, a pinion on the shaft, means to prevent reverse rotation of the shaft, a plunger having a rack adapted to engage the pinion, a lug on the shaft, said plunger having a shoulder above the rack and a surface extending longitudinally of the plunger from said shoulder to a point near the lower portion of the rack, said lug being arranged to be engaged by said shoulder when the plunger is moved downwardly and to slide along said surface when the shaft is held against rotation and the plunger is moving upwardly, means to reciprocate the plunger, a finger on the plunger, near said shoulder arranged to engage a tooth of the pinion, and means to limit lateral movement of the plunger away from the pinion.

6. The combination of a bobbin skewer, a shaft operatively connected to the skewer, a pinion on the shaft, means to prevent reverse rotation of the shaft, a plunger having a rack adapted to engage the pinion, a lug on the shaft, said plunger having a shoulder above the rack and a surface extending longitudinally of the plunger from said shoulder to a point near the lower portion of the rack, said lug being arranged to be engaged by said shoulder when the plunger is moved downwardly and to slide along said surface when the shaft is held against rotation and the plunger is moving upwardly, means to move the plunger downwardly, a spring tending to move the plunger upwardly and also in the direction to move the rack toward the pinion, a finger on the plunger near said shoulder arranged to engage a tooth of the pinion, means to limit lateral movement of the plunger away from the pinion, and means to guide the rack away from the pinion.

7. The combination of a bobbin supporting skewer, a shaft operatively connected to the skewer to move the latter into and out of operative position, a pinion on the shaft, means to prevent reverse rotation of the shaft, a rack adapted to engage the pinion, and means to operate the rack.

8. The combination of a bobbin supporting skewer, a rotatable element pivoted to one end of the skewer to reciprocate the latter, fulcrum means slidably engaging the skewer between its ends, a pinion connected with said rotatable element, a rack engaging the pinion, and means for reciprocating the rack.

9. The combination of a skewer, a rotatable element pivoted to one end of the skewer, a bobbin-engaging member at the other end of the skewer, means actuated by the rotation of said element for operating said member to engage and release the bobbin, and fulcrum means slidably engaging the skewer between its ends.

10. The combination of a skewer, a rotatable element pivoted to one end of the skewer, a bobbin-engaging member at the other end of the skewer, means actuated by the rotation of said element for operating said member to engage and release the bobbin, and means for guiding the skewer during the rotation of said element.

11. A winder having, in combination, a compartment having an open side and a floor inclined downwardly toward said side, a member arranged to support a bobbin in said compartment while the bobbin is being unwound, and means to effect disengagement of the spent bobbin from said member, the bobbin falling from said compartment through said open side.

12. The combination of a skewer, a bobbin-engaging member on the skewer, and means for operating said member to release a bobbin and for withdrawing said skewer from the bobbin.

13. A combination of a skewer, a rotatable element, a crank pin on said element, one end of the skewer being pivotally mounted on said pin, said pin having a cam portion, a bobbin-engaging member at the other end of the skewer, means actuated by said cam portion for operating said member to engage and release a bobbin, and fulcrum means slidably engaging the skewer between its ends.

14. A combination of a skewer, a crank arm having a crank pin on which one end of the skewer is pivotally mounted, said pin having a cam portion, a bobbin-engaging member at the other end of the skewer, means actuated by said cam portion for operating said member to engage and release a bobbin, and means for guiding the skewer during the rotation of the crank arm.

15. The combination of a compartment having an open side and a floor inclined downwardly toward said side, a skewer arranged to support a bobbin in said compartment, and means to effect disengagement of the bobbin from the skewer within the compartment.

16. The combination of a compartment having an open side and a floor inclined downwardly toward said side, said floor having an opening therein, a skewer projecting into said compartment through the opening in the floor, said opening being too small for the passage therethrough of a bobbin, and means to move the skewer outwardly in said opening.

17. The combination of a yarn-mass holding device and means for reciprocating said device and swinging it on an axis intermediate its ends to place said device into and out of association with a yarn mass and move the yarn mass.

18. The combination of a bobbin skewer, a rotatable element pivoted to one end of the skewer, for reciprocating the latter and fulcrum means slidably engaging the skewer between it ends.

19. The combination of a bobbin skewer, a crank arm pivoted to one end of the skewer, for reciprocating the latter, fulcrum means slidably engaging the skewer between its ends, and means to revolve the crank arm.

20. A winder having, in combination, a bobbin-holding device, to hold a bobbin in upright position while it is being unwound, a rotatable element connected to one end of the device for reciprocating the latter, and fulcrum means slidably engaging the device between its ends.

21. A bobbin holder comprising a reserve bobbin pocket and a compartment and a bobbin-holding device movable into and out of said pocket and compartment to transfer a bobbin from the pocket to the compartment.

22. The combination of a reserve bobbin pocket, means forming a space for the unwinding of a bobbin, and a skewer movable from said pocket to said space to transfer a bobbin from the pocket to said space.

23. A winder having, in combination, a stationary pocket to hold a reserve bobbin, means forming a space for the unwinding of the bobbin and a device movable to carry the bobbin from the pocket to said space and support the bobbin while it is being unwound.

24. In a winder, the combination of a stationary reserve bobbin pocket, means forming a space behind said pocket for the unwinding of a bobbin, and yieldable means separating said pocket from said space.

25. The combination of a reserve bobbin holder, a device arranged to support a bobbin in unwinding position, and means for moving said device into engagement with a bobbin in said holder and into unwinding position.

26. A winder having, in combination, a stationary pocket into which the operator may drop a full bobbin, a skewer to hold a bobbin while being unwound, and means for moving the skewer into engagement with a bobbin in said pocket.

27. A winder having, in combination, a skewer to support a bobbin while the latter is being unwound, and means for reciprocating said skewer and swinging it on an axis intermediate its ends to move its upper end into and out of unwinding position.

28. A winder having, in combination, a bobbin skewer, and means for moving the skewer into and out of bobbin-unwinding position, said means including a pinion, a plunger carrying a rack adapted to mesh with the pinion, a spring tending to hold the rack in mesh with the pinion and also tending to move the plunger in one direction, and means arranged to travel along the winder to move said plunger in the opposite direction.

29. A winder having, in combination, a bobbin skewer and means for moving the skewer into and out of bobbin-unwinding position, said means including a pinion, a gear element adapted to mesh with the pinion, a spring tending to hold said gear element in mesh with the pinion and also tending to move said gear element in one direction, and means to move said gear element in the opposite direction.

30. A winder having, in combination, a skewer, means for moving the skewer into and out of bobbin-unwinding position, said means including gear-elements which are disengageable from each other, and means arranged to travel along the winder to actuate said skewer-moving means.

31. A winder having, in combination, a bobbin-skewer, a shaft operatively connected to the skewer, a pinion on the shaft, a gear element adapted to mesh with the pinion, a spring for moving said gear element in one direction, and means arranged to travel along the winder for moving said gear element in the opposite direction.

32. A winder having, in combination, a bobbin skewer, a shaft operatively connected to the skewer, a pinion on the shaft, a plunger carrying a rack adapted to mesh with the pinion, a spring for moving the plunger in one direction, and means arranged to travel along the winder for moving the plunger in the opposite direction.

33. A winder having, in combination, a bobbin skewer and means for moving the skewer into and out of bobbin-unwinding position, said means being arranged to yield in case movement of the skewer is interfered with, and means arranged to travel along the winder to actuate said skewer-moving means.

34. A winder having, in combination, a bobbin skewer, a rotatable element operatively connected to the skewer, a plunger arranged to rotate said element when the plunger is moved in a certain direction, and means normally preventing rotation of said element when the plunger is moved in the opposite direction.

35. A bobbin skewer comprising, in combination, a tubular stem having a head adapted to enter the lower portion of the bore of a bobbin, said head having three equidistant slots, bobbin-engaging fingers pivoted for movement in said slots, each finger having a projection above and one below its axis, a plunger reciprocable axially of said stem and having two conical surfaces, one to engage the upper projections on the fingers and the other to engage the lower projections, a coiled spring within the stem arranged to move said plunger in one direction, and a cam for moving the plunger in the opposite direction.

36. A bobbin skewer comprising, in combination, a tubular stem having a head adapted to enter the lower portion of the bore of a bobbin, said head having a slot, a bobbin-engaging finger pivoted for movement in said slot, said finger having a projection above and one below its axis, a plunger reciprocable axially of said stem and having two conical surfaces, one to engage the upper projection and the other to engage the lower projection, a coiled spring within the stem arranged to move said plunger in one direction, and means for moving the plunger in the opposite direction.

37. A bobbin skewer comprising, in combination, a tubular stem having a head adapted to enter the lower portion of the bore of a bobbin, a bobbin-engaging finger pivoted for movement in said head, said finger having a projection above and one below its axis, a plunger reciprocable axially of said stem and having two conical surfaces, one to engage the upper projection and the other to engage the lower projection, and means for reciprocating the plunger.

38. A bobbin-supporting structure comprising a reserve-bobbin pocket having a stationary front wall, a stationary unwinding compartment directly behind said pocket, a top wall for said compartment, said top wall having a thread guide, a clamp above said structure for the end of the thread on a reserve-bobbin, said top wall having a passage through which said thread may pass laterally to the thread guide, and a guard finger extending forwardly over the reserve-bobbin pocket at one side of said passage.

39. A bobbin-supporting structure comprising a reserve-bobbin pocket having a stationary front wall, an unwinding compartment behind said pocket, a yieldable partition between the pocket and said compartment, a top wall for said compartment, said top wall having a thread guide, a clamp above said structure for the end of the thread on a reserve-bobbin, said top wall having a passage through which said thread may pass laterally to the thread guide, and a guard finger extending forwardly over the reserve-bobbin pocket at one side of said passage.

40. A bobbin-holder comprising two side walls, means between the forward portions of said walls for forming a reserve bobbin pocket having a forwardly inclined front wall and a bottom wall, a yieldable partition defining a compartment behind the pocket, the rear side of said compartment being open, and a floor in said compartment inclined downwardly toward said open side.

41. A bobbin-holder comprising a reserve bobbin pocket having a bottom wall and a forwardly-inclined front wall, a yieldable partition defining a compartment behind the pocket, the lower portions of said front wall and partition being relatively close together so as to position the butt of a reserve bobbin, the rear side of said compartment being open, a floor in said compartment inclined downwardly toward said open side, said bottom wall and floor having a slot therein, a bobbin skewer extending through said slot, and means to operate the skewer.

42. The combination of a bobbin-supporting structure comprising a rigid framework, the forward portion of which constitutes a reserve-bobbin pocket and the rear portion an unwinding compartment, a yieldable partition separating the pocket and the compartment, a bobbin skewer movable from one to the other of said spaces, and means for thus moving the skewer.

43. A bobbin-supporting structure comprising a rigid framework, the forward portion of which constitutes a stationary reserve-bobbin pocket and the rear portion an unwinding compartment, and a yieldable partition separating the pocket and the compartment.

44. A bobbin-supporting structure comprising a rigid framework, the forward portion of which constitutes a stationary reserve-bobbin pocket and the rear portion an unwinding compartment, and a yieldable partition separating the pocket and the compartment, the lower portion of said pocket being contracted to position the butt of the reserve bobbin.

45. In a winder, a reserve-bobbin pocket having a bottom wall having an opening therein and front and rear walls which converge toward their lower ends so as to position the butt of a reserve bobbin on said bottom wall, with the bore of the bobbin registering with the opening in the bottom wall, and a skewer arranged to be inserted into said opening to enter the butt of the bobbin.

46. A bobbin-supporting structure comprising a reserve-bobbin pocket having a stationary forwardly inclined front wall, an unwinding compartment behind said pocket, and a yieldable partition between the pocket and said compartment, said front wall and partition converging toward their lower ends.

47. A bobbin-supporting structure comprising a reserve-bobbin pocket having a stationary forwardly inclined front wall, an unwinding compartment behind said pocket, and a yieldable partition betwen the pocket and said compartment.

48. The combination of a bobbin-supporting structure comprising a rigid framework, the forward portion of which constitutes a reserve-bobbin pocket and the rear portion an unwinding compartment, and a bobbin skewer shiftable from one to the other of said spaces.

49. A winder having, in combination, a compartment having an open rear side for the discharge of a spent bobbin and a floor, said floor having an opening therein, a skewer adapted to project into said compartment through the opening in the floor, said opening being too small for the passage therethrough of a bobbin, and means to move the skewer outwardly in said opening to strip the bobbin therefrom.

50. A bobbin skewer having a seat for the butt of a bobbin, a member pivoted on the skewer and having a point adapted to engage the interior wall of the bobbin at a point above said seat, and means for pivotally moving said member.

51. A bobbin skewer having a head adapted to enter only the lower end of a bobbin, said head having fixed thereto a flaring lower portion forming a seat for the bobbin butt, and means on said head for gripping the interior wall of the bobbin at a point above said seat.

52. The combination of a stationary element having an opening therein, a bobbin skewer arranged to project through said opening, and means to cause relative separating movement between said element and the skewer to strip the bobbin from the latter, said opening being too small to permit the passage of the bobbin.

In testimony whereof, I have hereunto set my hand.

BURT A. PETERSON